Jan. 16, 1951 A. J. HENQUET ET AL 2,537,998
ELECTRICAL SIGNALING SYSTEM
Filed Aug. 2, 1947
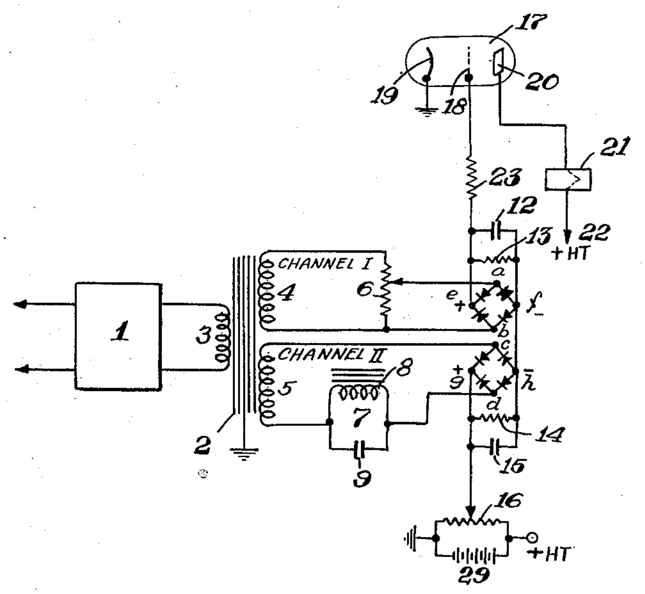
INVENTORS
ANDRE J. HENQUET
MAURICE C. CONSTANT
BY Robert Harding Jr.
ATTORNEY Patented Jan. 16, 1951 2,537,998

UNITED STATES PATENT OFFICE 2,537,998

ELECTRICAL SIGNALING SYSTEM

Andre Jean Henquet and Maurice Charles Constant, Seine, France, assignors to International Standard Electric Corporation, New York, N. Y., a corporation of Delaware Application August 2, 1947, Serial No. 765,780
In France May 18, 1946

Section 1, Public Law 690, August 8, 1946
Patent expires May 18, 1966

5 Claims. (Cl. 179—3)

This invention has reference to an electrical signaling device, meant in particular for long distance telephone lines.

One of the main objects of this invention is to allow of the use of a signaling code at an industrial frequency, while retaining the advantages offered by voice frequency transmissions over lines, in particular, the quality of passing through the repeaters and of suffering less attenuation along the cables.

Another object of this invention is that of making it possible to discriminate between the signaling current and the other currents which pass through the line, particularly in the case of an application to telephony, of distinguishing the signaling current from the conversation currents. It is well known that, in the case of the human voice, the maximum fundamental frequency reached is of 1,500 C. P. S., which has led, in this case, to choose for signaling purposes a frequency higher than 1,500 C. P. S., namely, one located "at the top" of the passing band. However, the frequency used may well be different and, in particular, be located in the lower part of the passing band.

The devices conceived in accordance with the invention also have the purpose of eliminating the difficulties created by the presence of disturbing currents due to harmonics or sub-harmonics of the signaling frequency, by the use of an automatically controlled safety device.

Finally, such devices as embody some of the characteristics of the invention have a very wide range of operation. When used in toll (long distance) telephony, they tolerate wide variations in the input levels of the signaling frequency, such as, in the usual type of equipment, make the use of level equalizers imperative.

Devices made in accordance with the principles of the invention will accordingly be applied to a line through which there circulate currents having various frequencies, one of which is the signaling frequency.

According to a characteristic of the invention, means are provided to transmit all these currents over two distinct ways, the first of which is equipped with means for the uniform attenuation of all frequencies and the second of which is equipped with means affording maximum attenuation of the signaling frequency. Means then are provided for the rectification of the currents which pass through the two ways. Means are further provided to apply to the electrode of an electronic relay the resultant of the voltages obtained from rectifying devices. This resultant is sufficient only if there be a signal on the line. Finally, means are provided to make use of the operation of the electronic relay then indicating the presence of the signaling frequency on the line.

The invention will be the better understood after reading a typical embodiment described in relation with the attached illustration in which the single figure is a diagram of an embodiment making use of some of the characteristics of this invention in the case of signaling over a telephone line.

It will be seen, by referring to this figure, that the device comprises an amplifier 1, which receives the line current and all frequencies; a transfer 2 consisting of a primary winding 3 and two secondaries 4 and 5. The amplifier is connected to the line by some suitable means. This assembly constitutes a typical embodiment of the means which permit to place the line frequencies on two circuits.

All frequencies thus will be found again at the output of 4 as well as at the output of 5.

At the output of winding 4, there will be found a potentiometer 6 which gives, at the terminals *a* and *b* of a rectifying system 10, all the line frequencies after equal attenuation.

On the other hand, the output of winding 5 is connected to a rejector circuit comprising an oscillatory circuit 7 itself made up of an inductor 8 and a capacitor 9.

The frequencies found at points *c* and *d* thus will be those present on the line minus those stopped by rejector circuit 7. Since the rejector circuit is tuned to the signaling frequency, the latter is rejected. At *c* and *d* of 11, one thus will find again all the line frequencies, minus the signaling frequency.

Means have been provided to rectify these currents. These means, in the embodiment chosen as an example consist of rectifiers 10 and 11, with which are associated circuits consisting respectively of resistors 13 and 14 and capacitors 12 and 15. The voltages present at the terminals of capacitors 12 and 15 are practically constant.

It will be noted that the rectifiers are opposition connected and that their output potentials thus are subtractive.

The resultant current from this arrangement is added to the biasing potential 29 of an electronic relay 17 which is, in the embodiment chosen as an example, a cold cathode tube consisting of a cathode 19, a control grid 18 and an anode 20. The means provided to make use of the tube reaction are inserted into the anode circuit. These means have been shown in the form of the winding of a relay 21.

Two cases are possible:

The signaling frequency is not sent over the line. In this case, there will appear potentials, at *e* and *f* on the one hand, and *g* and *h* on the other hand, created exclusively by the frequencies different from the signaling frequency. Since the potentials are subtractive, it is possible, by proper adjustment of 6, to obtain exact compensation. The signaling frequency is sent over the line. In this case, there appears at *e* and *f* a potential due to all the frequencies, at *g* and *h* a potential to all frequencies other than the signaling frequency. The difference between the potential which appears on the grid 18, in the second case, and the potential found on the same grid in the first case is entirely due to the signaling frequency, to the exclusion of all other causes, including harmonics.

Adequate provision is made, by suitable adjustment, for electronic relay 17, which operates in the second case, not to operate in the first case.

Adjustment is carried out at 6 and 16 both. The effect of 6 is to give exact compensation between the potential difference at *e* and *f* and the potential difference between *g* and *h*. Potentiometer 16 serves to adjust the bias of the electronic relay. The rejector circuit stops only the signaling frequency. Accordingly, the signaling frequency operates the system to the exclusion of other currents, even if they be harmonics of said signaling frequency. This device is very simple. The example chosen comprises a rejector circuit, with which one may associate a filter, in particular in cases in which the signaling frequency is not at the edge of the frequency band passed. In the last mentioned case, however, it has been necessary to adapt the impedances of the various ways by means of transformers.

Even though the invention has been described above with an embodiment, it is by no means limited to said example and capable of a number of variations and modifications, without thereby exceeding the scope of the invention.

We claim:

1. In combination, a telephone line carrying alternating currents of different frequencies, including signaling frequencies, two circuit paths, means for connecting said line with said paths for said frequencies, a potentiometer in the first path uniformly to attenuate all frequencies, means including a rejector circuit in the second path to attenuate the signaling frequency, means including rectifiers and filters to rectify the output of each path, means to combine the rectified outputs in opposition to each other, thus to produce a resultant direct potential corresponding to the signaling frequency if one exists, an electronic relay, means including a biasing battery and a potentiometer to control the electronic relay by the resultant potential, and means responsive to said electronic relay to indicate the presence of the signaling frequency on the line.

2. In a telephone transmission system, a transformer having a primary and two secondary windings, a telephone line connected with the primary, two rectifiers connected to said transformer, a potentiometer connecting a first rectifier to the first secondary to receive all line frequencies and uniformly to attenuate them, a rejector circuit tuned to signaling frequency connecting a second rectifier to the second secondary to receive all line frequencies except the signaling frequencies, an electronic relay having a control grid, a connection from the control grid to the first rectifier, a source of biasing potential, and a connection from said source and the second rectifier to said control grid.

3. In a telephone transmission system, a transformer having a primary and two secondary windings, a telephone line connected with the primary, a potentiometer connecting two opposite points of a first rectifier bridge across the first secondary to receive all line frequencies and uniformly to attenuate them, a rejector circuit tuned to signaling frequency connecting two opposite points of a second rectifier bridge across the second secondary to receive all line frequencies except the signaling frequencies, an electronic relay having a control grid, a connection comprising a resistance and capacitance connected in parallel for bridging the control grid across the other two oppositely poled points of the first rectifier bridge, a source of biasing potential, a connection including a resistance and capacitance connected in parallel for bridging said source across the other two oppositely poled points of the second rectifier bridge, and a connection from one of the last mentioned points of the first bridge to the like poled last mentioned point of the second bridge, whereby when no signaling frequency exists on the line the potential applied to said control grid remains unchanged, but said potential changes with the signaling frequency on the line.

4. In combination a telephone line carrying alternating currents of different frequencies, including a signal frequency, two circuit paths, means for connecting said line with said two paths, means including rectifiers and filters to rectify the output of each path, potentiometer means in the first of said paths connected across a first rectifier uniformly to attenuate all frequencies, means including a rejector circuit in the second path connected across a second rectifier to attenuate all frequencies minus the signal frequency, means to combine the rectifier outputs in opposition to each other, thus to produce a resultant direct potential corresponding to the signalling frequency if one exists, an electronic relay having a control grid, means including a biasing battery and a potentiometer connected to said control grid to control the electronic relay by said resultant potential and means responsive to said electronic relay to indicate the presence of the signalling frequency on the line.

5. In a telephone transmission system a transformer having a primary and two secondary windings, a telephone line connected with the primary winding, a potentiometer connecting a first rectifier to the first secondary winding to receive all line frequencies and uniformly to attenuate them, a rejector circuit tuned to the signalling frequency connecting a second rectifier to the second secondary winding to receive all frequencies except the signalling frequency, an electronic relay having a control grid, a circuit for connecting said control grid across the opposite poles of said first rectifier, a source of biasing potential, a second circuit for connecting said source to the opposite poles of said second rectifier, a connection from one of said poles of said first rectifier to one of said like poles of said second rectifier whereby the grid potential remains unchanged when no signalling frequency exists on the line but becomes changed when the signalling frequency exists on the line.

ANDRE JEAN HENQUET.
MAURICE CHARLES CONSTANT.

REFERENCES CITED

The following references are of record in the file of this patent:

UNITED STATES PATENTS

| Number | Name | Date |
|---|---|---|
| 1,958,166 | Laurent | May 8, 1934 |
| 2,138,613 | Pruden | Nov. 29, 1938 |
| 2,145,053 | Meszar | Jan. 24, 1939 |
| 2,282,131 | Hadfield | May 5, 1942 |